United States Patent
Zeis et al.

(10) Patent No.: US 8,301,772 B2
(45) Date of Patent: Oct. 30, 2012

(54) METHOD AND APPARATUS FOR ALLOCATING RESOURCES AMONG BACKUP TASKS IN A DATA BACKUP SYSTEM

(75) Inventors: Michael Zeis, Minneapolis, MN (US); Thomas Hartnett, Saint Paul, MN (US); Adonijah Park, Forest Lake, MN (US)

(73) Assignee: Symantec Corporation, Mountain View, CA (US)

( * ) Notice: Subject to any disclaimer, the term of this patent is extended or adjusted under 35 U.S.C. 154(b) by 799 days.

(21) Appl. No.: 11/728,617

(22) Filed: Mar. 27, 2007

(65) Prior Publication Data

US 2008/0244601 A1    Oct. 2, 2008

(51) Int. Cl.
*G06F 15/16* (2006.01)
(52) U.S. Cl. .................. 709/226; 709/222; 709/224
(58) Field of Classification Search .............. 709/226
See application file for complete search history.

(56) References Cited

U.S. PATENT DOCUMENTS

| 2004/0205206 A1* | 10/2004 | Naik et al. ............... 709/230 |
| 2006/0136701 A1* | 6/2006 | Dickinson ............... 712/205 |
| 2009/0083749 A1* | 3/2009 | Creamer et al. ......... 718/104 |

OTHER PUBLICATIONS

Karakas, Chris, "Using AMANDA to backup vfat filesystems—Introduction," downloaded from web site http://www.karakas-online.de/myAMANDA/introduction.html, Copyright © 2001.

* cited by examiner

*Primary Examiner* — Kenny Lin
*Assistant Examiner* — Sulaiman Nooristany
(74) *Attorney, Agent, or Firm* — Campbell Stephenson LLP

(57) ABSTRACT

Method and apparatus for allocating resources among backup tasks in a data backup system is described. One aspect of the invention relates to managing backup tasks in a computer network. An estimated resource utilization is established for each of the backup tasks based on a set of backup statistics. A resource reservation is allocated for each of the backup tasks based on the estimated resource utilization thereof. The resource reservation of each of the backup tasks is dynamically changed during performance thereof.

11 Claims, 6 Drawing Sheets

METHOD AND APPARATUS FOR ALLOCATING RESOURCES AMONG BACKUP TASKS IN A DATA BACKUP SYSTEM

BACKGROUND OF THE INVENTION

1. Field of the Invention

Embodiments of the invention generally relate to data backup systems and, more specifically, to a method and apparatus for allocating resources among backup tasks in a data backup system.

2. Description of the Related Art

Computer systems and their components are subject to various failures that may result in the loss of data. For example, a storage device used in or by the computer system may experience a failure (e.g., mechanical, electrical, magnetic, etc.) that may make any data stored on the device unreadable. Erroneous software or hardware operation may corrupt the data stored on a storage device and effectively destroy the data stored on an otherwise properly functioning storage device.

To mitigate the risk of losing data, computer networks include backup systems for making backup copies of data stored on various storage devices. One type of backup system includes a dedicated backup server that backs up target data on one or more storage devices used in or by one or more computer systems, such as workstations and/or application servers. The backup server typically backs up the target data periodically according to a schedule. The data may be backed up initially to disk-based storage and then migrated to an archival storage, such as tape-based storage. The backup server may implement any of various known schemes to backup data, including full backups, incremental backups, differential backups, and the like. A full backup is a complete copy of the target data. An incremental backup is a backup that only contains the files that have changed since the most recent backup (either full or incremental). A differential backup is a cumulative backup of all changes made since the last full backup. The backup server typically operates in accordance with a backup policy that defines various parameters, such as the target data, the time window to perform the backup process, and the like.

In systems having multiple backup clients and a predefined set of resources for performing the backup, it is desirable to allocate the resources among the backup clients. Without such allocation, resources may be "oversubscribed" among competing backup clients. Such oversubscription leads to the failure of one or more backup tasks due to lack of sufficient resources (i.e., the resources are exhausted prior to completing all of the tasks). Some backup systems generate an inventory at the time of a backup client's backup to determine the size of the resources needed. Such a solution, however, can be computationally time consuming and add an unacceptable amount of delay to the backup process.

Therefore, there is a need for optimal and efficient allocation of resources among backup tasks in a data backup system.

SUMMARY OF THE INVENTION

Method and apparatus for allocating resources among backup tasks in a data backup system is described. One aspect of the invention relates to managing backup tasks in a computer network. An estimated resource utilization is established for each of the backup tasks based on a set of backup statistics. A resource reservation is allocated for each of the backup tasks based on the estimated resource utilization thereof. The resource reservation of each of the backup tasks is dynamically changed during performance thereof.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
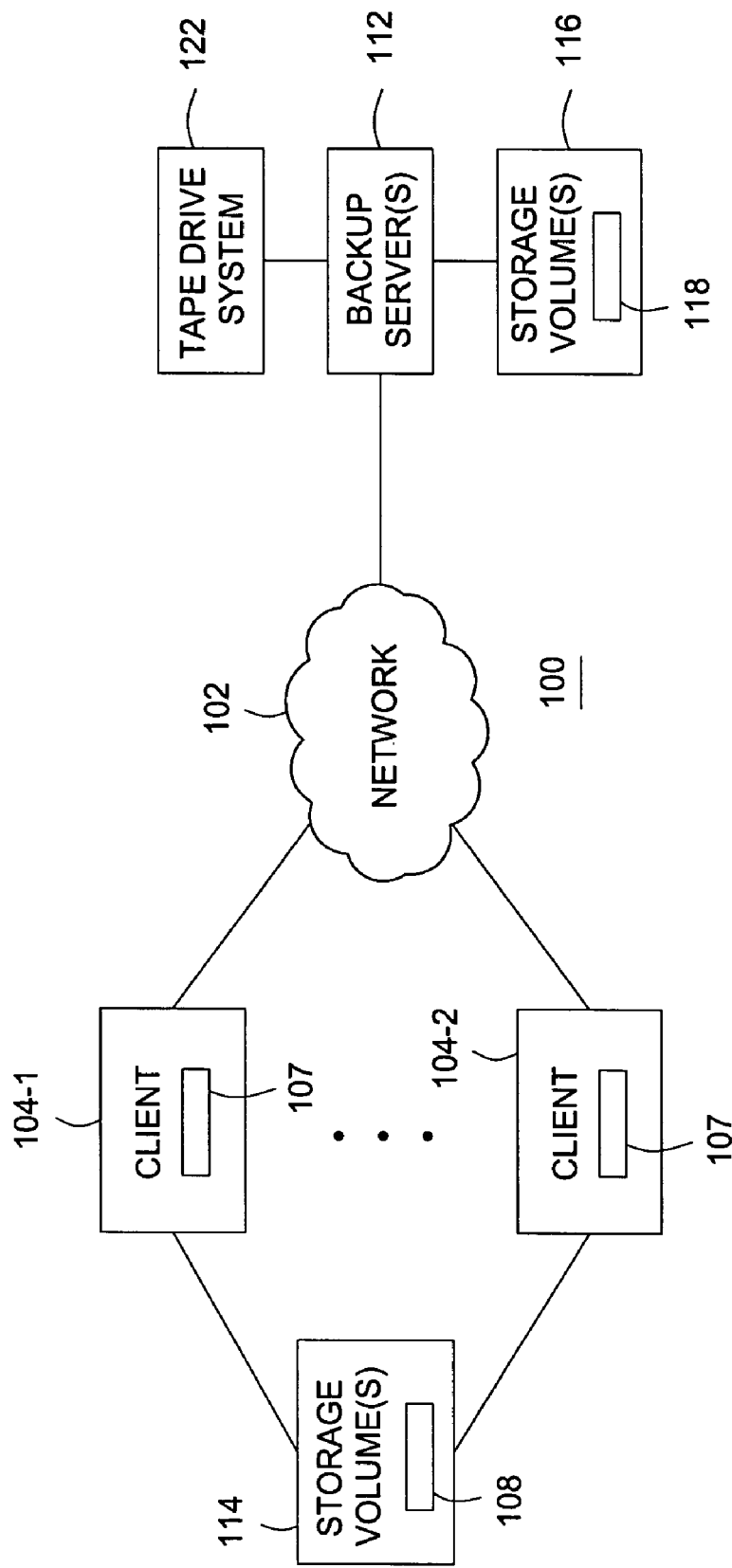
FIG. 1 is a block diagram depicting an exemplary embodiment of a networked computer system in accordance with one or more aspects of the invention.

FIG. 1 is a block diagram depicting an exemplary embodiment of a networked computer system 100 in accordance with one or more aspects of the invention. The system 100 includes a network 102, clients 104-1 through 104-N (collectively clients 104), and one or more backup servers 112. The network 102 comprises a communication system that connects computer systems by wire, cable, fiber optic, and/or wireless links facilitated by various types of well-known network elements, such as hubs, switches, routers, and the like. The network 102 may employ various well-known protocols to communication information. The clients 104 may comprise various types of computers, such as laptops, desktop computers, workstations, servers, and the like.

The clients 104 manage one or more storage volumes 114. The storage volumes 114 may be implemented using any type of storage system or storage systems, such as a disk drive system. A disk drive system may include, for example, one or more storage disks, e.g., an array of storage disks or redundant array of storage disks. A volume is a logical storage construct that does not necessarily correspond to any particular physical storage device. A physical storage device may include more than one volume, and a volume may span more than one storage device. The storage volumes 114 store source data 108, such as application programs and program data created and managed by the clients 104. The source data is organized into a file system. A file system refers to the structure and arrangement of files in a storage device. For example, a file system typically includes a hierarchy of directories, each of which may contain one or more files.

Each of the clients 104 includes a backup client 107. The backup client 107 is configured to cooperate with a backup service (discussed below) to backup one or more items of the source data 108 (referred to as backup tasks). That is, a backup task includes an instruction to backup a particular item of data, such as, a particular storage volume, a particular file system, a particular storage device, or the like. The backup client 107 initiates backup task(s) in accordance with a particular schedule. For example, a given task may be executed hourly, daily, weekly, monthly, or over like type execution cycles.

The backup servers 112 host a backup service for the clients 104. The backup servers 112 may be implemented using any type of computer systems capable of hosting a backup service. The backup servers 112 are configured to manage one or more storage volumes 116. The storage volumes 116 may be implemented using the same storage system that implements the storage volume 114, or using a separate storage system (e.g., a separate disk drive system). The backup servers 112 are also coupled to a tape drive system 122. The tape drive system 122 may include one or more tape drives. The storage volume 116 stores backup data 118 that comprises a backup of the source data 108. The backup data 118 may then be migrated to the tape drive system 122.

Figure 2:
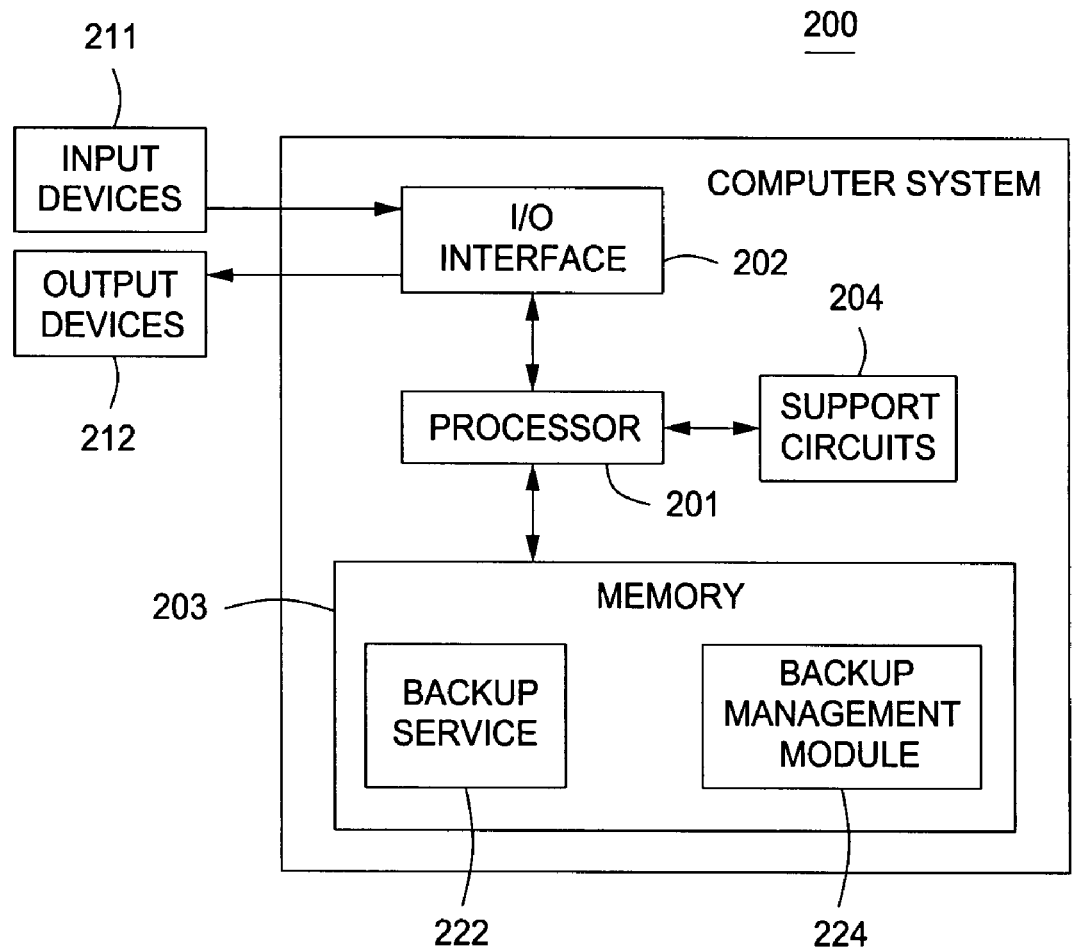
FIG. 2 is a block diagram depicting an exemplary embodiment of a computer system in accordance with one or more aspects of the invention.

FIG. 2 is a block diagram depicting an exemplary embodiment of a computer system 200 in accordance with one or more aspects of the invention. The computer system 200 may be used to implement one or more of the backup servers 112. The computer system 200 includes a processor 201, a memory 203, various support circuits 204, and an I/O interface 202. The processor 201 may include one or more microprocessors known in the art. The support circuits 204 for the processor 201 include conventional cache, power supplies, clock circuits, data registers, I/O interfaces, and the like. The I/O interface 202 may be directly coupled to the memory 203 or coupled through the processor 201. The I/O interface 202 may also be configured for communication with a network, with various storage devices, as well as other types of input devices 211 and output devices 212 (e.g., mouse, keyboard, display, etc).

The memory 203 stores processor-executable instructions and/or data that may be executed by and/or used by the processor 201. These processor-executable instructions may comprise hardware, firmware, software, and the like, or some combination thereof. Modules having processor-executable instructions that are stored in the memory 203 may include a backup service 222 and a backup management module 224. The backup service 222 may be part of a backup service implemented by multiple backup computer systems. That is, backup service modules may be distributed across multiple computer systems to implement a backup service for a computer network. The backup management module 224 manages the reservation and allocation of system resources to backup tasks, as described further below. The computer system 200 may be programmed with an operating system 226, which may be OS/2, Java Virtual Machine, Linux, Solaris, Unix, Windows, Windows95, Windows98, Windows NT, and Windows2000, WindowsME, and WindowsXP, Windows Server, among other known platforms. At least a portion of an operating system may be disposed in the memory 203. The memory 203 may include one or more of the following random access memory, read only memory, magneto-resistive read/write memory, optical read/write memory, cache memory, magnetic read/write memory, and the like, as well as signal-bearing media as described below.

In one embodiment, the backup management module 224 cooperates with the backup service 222 to establish statistics for each backup task. For a given backup task, the statistics track the resources used by that backup task over time, such as the size of the backup (i.e., the amount of storage space used for the backup), the bandwidth consumed by the backup, and the like. The backup management module 224 employs trend-analysis of the statistics to establish an estimated resource utilization for each backup task. The estimated resource utilizations for the tasks are then stored for use during the next backup cycle. At the beginning of the next cycle for a given backup task, the backup management module 224 reserves resources for the task based on the estimated resource utilization (allocates a "resource reservation" to the task). Reserving resources ahead of time for the backup tasks avoids over-subscription of resources among the competing backup clients. The backup management module 224 is further configured to monitor the backup tasks as they are being performed in order to dynamically change the resource reservations. For example, as a given task is being performed, the backup management module 224 may periodically adjust the amount of storage space reserved for the task.

If the resources reserved for an executing backup task are insufficient, the backup management module 224 attempts to utilize any available resources (i.e., not reserved by other tasks). If the backup management module 224 is unable to find such resources, the backup management module 224 suspends the executing backup task. The backup management module 224 continues to monitor the availability of resources as other tasks are performed. If sufficient resources become available (e.g., released by another task) to allow the successful performance of the suspended task, the backup management module 224 reserves such resources for the suspended task and the suspended task is resumed. In some cases, resources may not become available and the suspended backup task fails. However, due to the resource reservation scheme implemented by the backup management module 224, the failure of this one task does not affect the other backup tasks. Without the resource reservations, a task may consume too many resources, causing multiple other competing backup tasks to fail.

Figure 3:
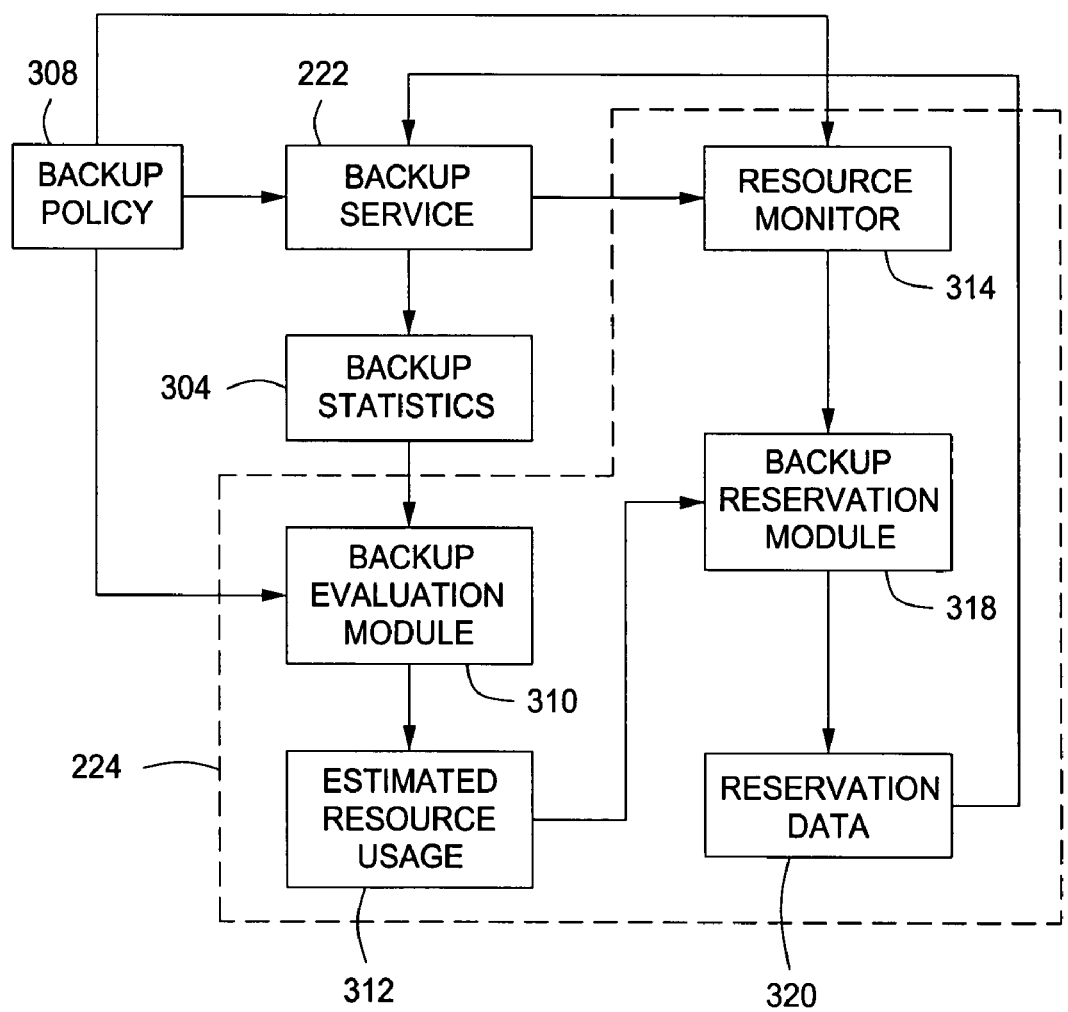
FIG. 3 is an exemplary block diagram depicting an exemplary embodiment of a backup management system in accordance with one or more aspects of the invention.

FIG. 3 is a block diagram depicting an exemplary embodiment of a backup management system 300 in accordance with one or more aspects of the invention. The backup management system 300 includes the backup service 222 in cooperation with the backup management module 224. The backup service 222 is configured to operate in accordance with a backup policy 308 and resource reservation data 320. The backup policy 308 includes a plurality of backup tasks that are currently being executed. The backup service 222 reserves resources for each backup task in accordance with the resource reservation data 320. The backup service 222 is also configured to provide backup statistics 304. The statistics 304 track the resources used by individual backup tasks over time, such as the size of the backup (i.e., the amount of storage space used for the backup), the bandwidth consumed by the backup, and the like.

The backup management module 224 includes a backup evaluation module 310, a resource monitor 314, backup reservation module 318 and a reservation allocation module 320. The backup evaluation module 310 is configured to obtain the backup statistics 304 and the backup policy 308. For each backup task in the backup policy 308, the backup evaluation module 310 uses the backup statistics 304 to establish an estimated resource utilization for the next cycle of that task. The backup evaluation module 310 may use any type of trend analysis technique known in the art. The backup evaluation module 310 may generated the estimated resource utilization for a given backup task after completion of a current execution cycle for that task. In this manner, a resource utilization is ready for the next execution cycle of the backup task. The backup evaluation module 310 produces estimated resource usage data 312 that includes the estimated resource utilizations.

The backup reservation module 318 obtains the estimated resource usage data 312. The backup reservation module 318 maintains resource reservation data 320, which includes a current resource reservation for each of the backup tasks. The backup reservation module 318 allocates an initial resource reservation to each backup task at the beginning of the next execution cycle using the estimated resource usage data 312. The resource reservation data 320 is provided to the backup service 302, which operates as described above. Thereafter, the backup reservation module 318 periodically adjusts the resource reservation for each backup task as the backup tasks are executed. In particular, the resource monitor 314 is configured to monitor the progress of each backup task for which resources have been reserved. The resource monitor 314 commands the backup reservation module 318 to adjust the resource reservations accordingly. For example, the resource monitor 314 may periodically command the backup reservation module 318 to reduce the resource reservation for each backup task as they are executed. In one embodiment, the backup tasks report their progress to the resource monitor 314 over time. This allows the backup tasks to proceed without being interrupted unnecessarily by the resource monitor 314.

The resource monitor 314 is also configured to detect completion of a backup task and command the backup reservation module 318 to release any remaining resource reservation for such backup task. The resource monitor 314 is further configured to detect that insufficient resources were initially reserved for a given backup task and to notify the backup reservation module 318 of such condition. The resource monitor 314 may also provide information as to the currently available resources that can be used by any backup task (i.e., unreserved resources). In response, the backup reservation module 318 allocates the hitherto unreserved resources to the backup task that requires additional resources, or if no such additional resources are available, suspends the backup task. The backup reservation module 318 may suspend a backup task by setting a flag in the resource reservation data 320 used by the backup service 302. Alternatively, the backup reservation module 318 may directly command the backup service to suspend the task. In either case, the resource monitor 314 is configured to notify the backup reservation module 318 upon availability of additional resources, and the backup reservation module 318 may command that the suspended task be resumed after reserving the additional resources. Otherwise, if such additional resources never become available or do not become available over a predefined time period, the backup reservation module 318 commands the backup service 302 to fail the suspended backup task.

For purposes of clarity by example, the backup management system 300 has been described as having discrete functional modules for backup service, backup evaluation, resource monitoring, and backup reservation. It is to be understood that the functions performed by such modules may be performed generally by one or more modules. That is, the functions of the modules 320, 310, 314, and 318 may be combined into one or more modules.

Figure 4:
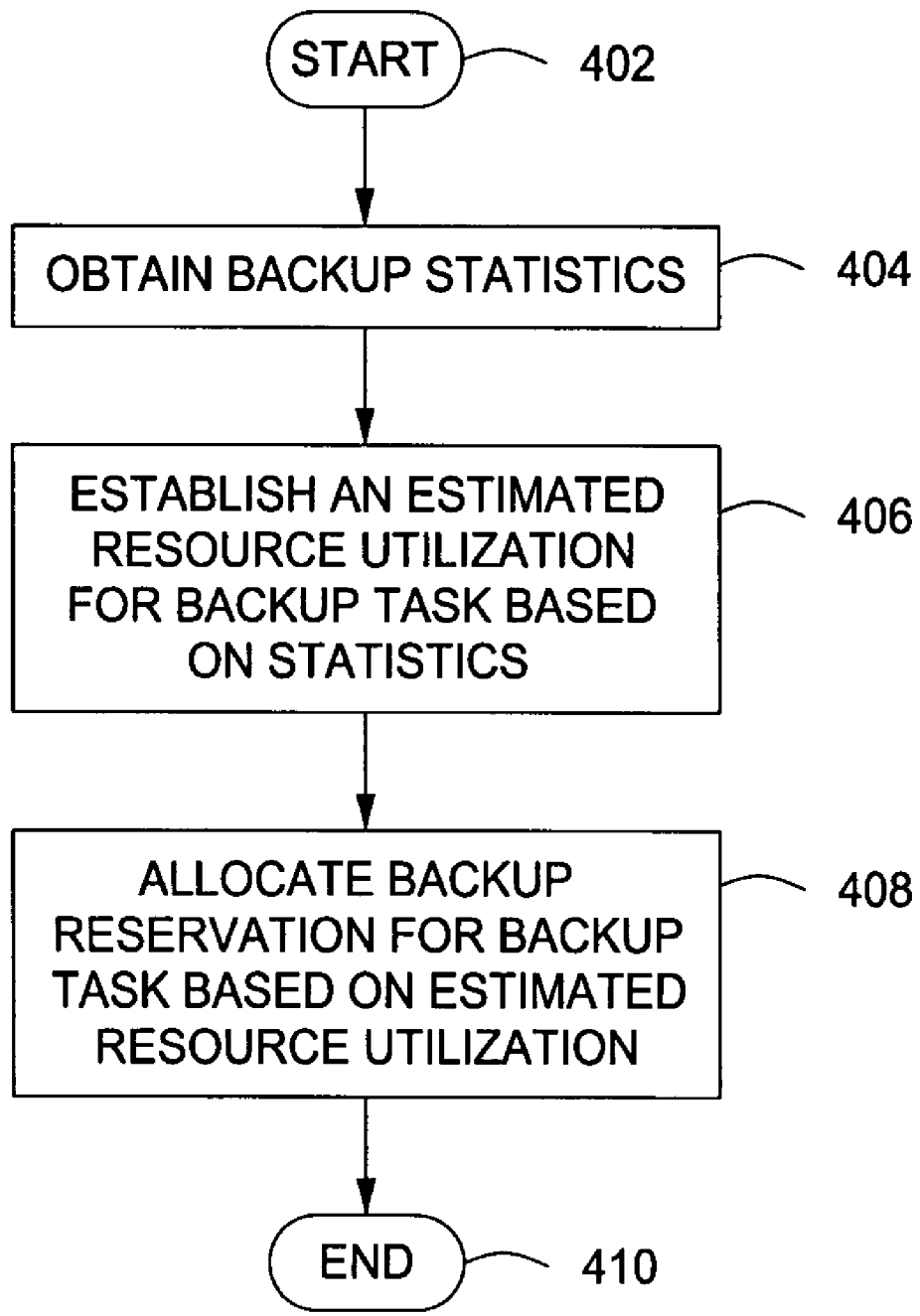
FIG. 4 is a flow diagram depicting an exemplary embodiment of a method for managing a backup task before the execution thereof in accordance with one or more aspects of the invention.

FIG. 4 is a flow diagram depicting an exemplary embodiment of a method 400 for managing a backup task before the execution thereof in accordance with one or more aspects of the invention. The method begins at step 402. At step 404, back up statistics for the backup task are obtained. In one embodiment, the backup statistics include a time series of disk resource usages. The backup statistics may also include a time series of bandwidth usages. At step 406, estimated resource utilization for the backup task is established based on the statistics. The estimated resource utilization may include an estimated disk space usage and/or an estimated bandwidth required to perform the backup task. At step 408, a backup reservation is allocated to the backup task based on the estimated resource utilization. That is, disk space is reserved for the backup task. The backup task may be assigned to a particular storage system based on the estimated bandwidth requirements (e.g., some storage systems may be faster than other storage systems and thus capable of handling higher bandwidths). The method 400 ends at step 410.

Figure 5:
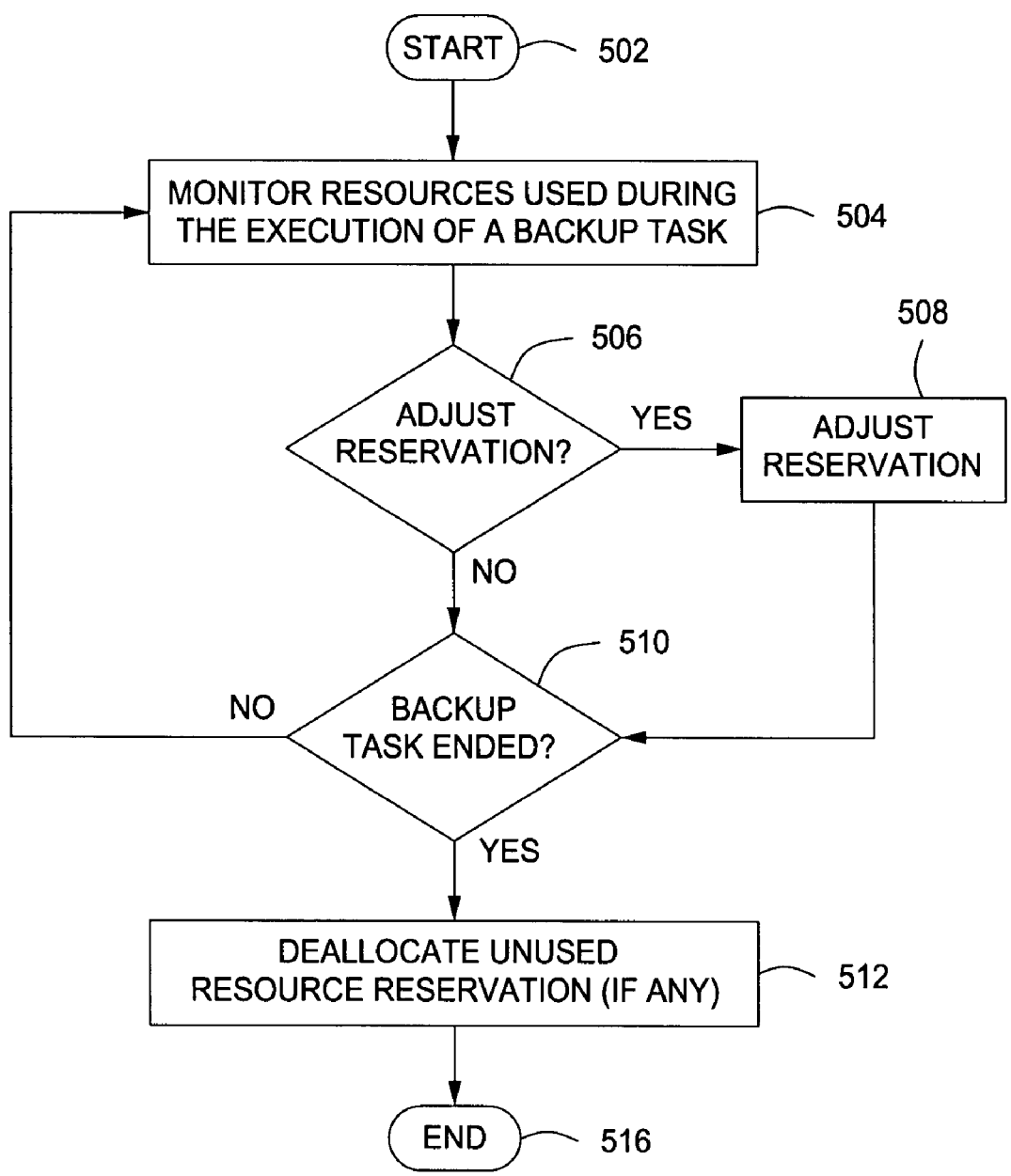
FIG. 5 is a flow diagram depicting an exemplary embodiment of a method for managing a backup task during the execution thereof in accordance with one or more aspects of the invention.

FIG. 5 is a flow diagram depicting an exemplary embodiment of a method 500 for managing a backup task during the execution thereof in accordance with one or more aspects of the invention. The method 500 begins at step 502. At step 504, resource utilization of the backup task is monitored during the execution of the backup task. That is, as the backup task is performed, resources are consumed. For example, disk space is consumed on disk resources and bandwidth is consumed during the transfer of data from a backup client to the storage system. At step 506, a determination is made whether the resource reservation for the backup task requires adjustment. For example, a reservation of disk space may be reduced as the backup task is executed. The periodicity of which the resource reservation is reduced may be determined based on the rate of resource consumption. For example, the rate of disk space consumption may determine how often the disk space reservation is reduced.

If at step 506 there exists a need to adjust the resources reserved to the executing backup task, the method 500 proceeds to step 508. At step 508, the resource reservation is adjusted. From step 508, the method 500 proceeds to step 510. If at step 506 the resource reservation of the executing backup task does not need to be adjusted, the method 500 proceeds to step 510. At step 510, a determination is made whether the backup task has completed. If not, the method 500 returns to step 504. If the executing backup task has completed, the method 500 proceeds to step 512. At step 512, any unused resource reservation is de-allocated. The method 500 ends at step 516.

Figure 6:
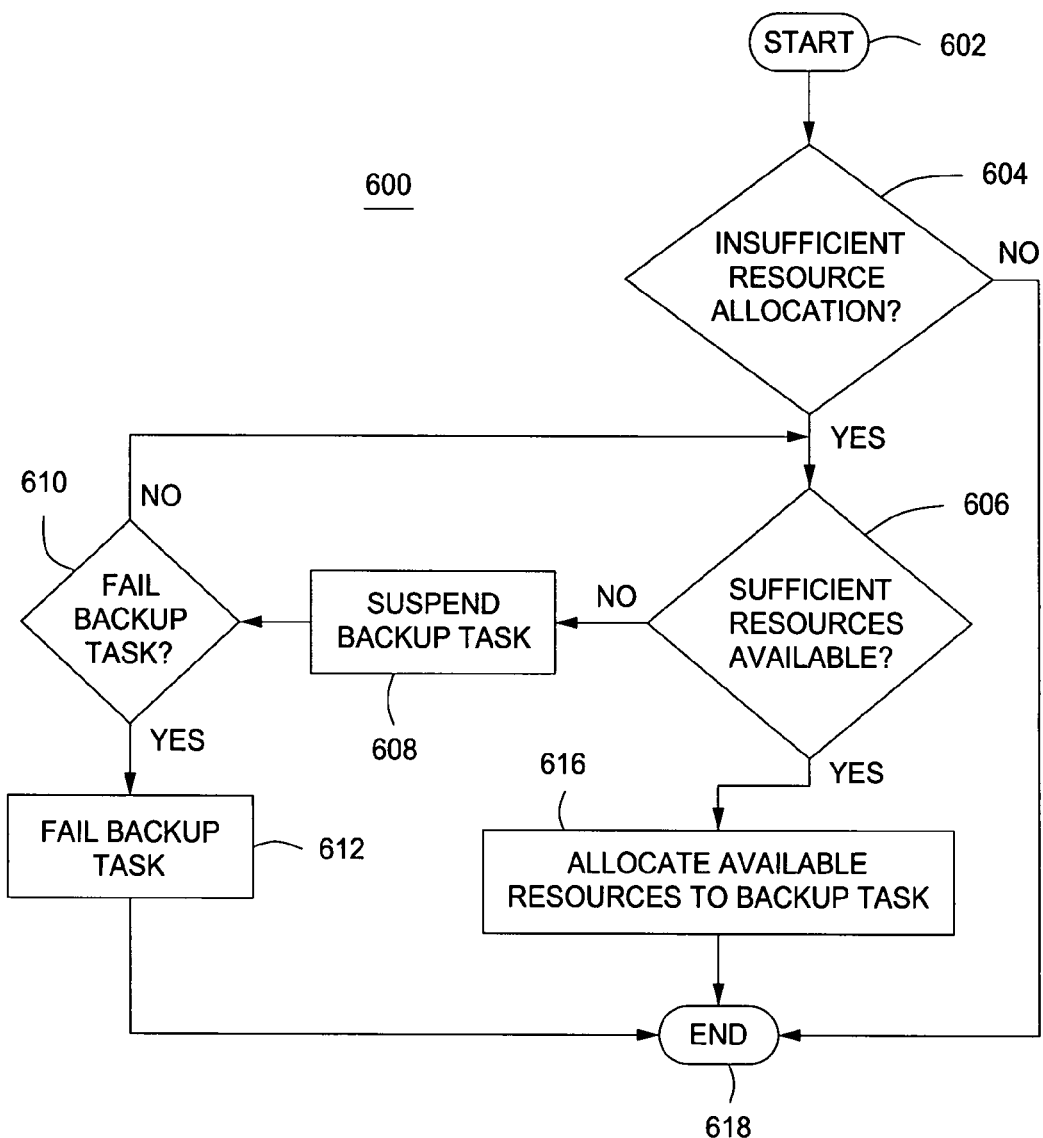
FIG. 6 is a flow diagram depicting an exemplary embodiment of a method for managing a backup task during the execution thereof a backup policy, where the backup task has not been allocated sufficient resources.

FIG. 6 is a flow diagram depicting an exemplary embodiment of a method 600 for managing a backup task during execution thereof, where the backup task has not been allocated a sufficient resource reservation. The method 600 begins at step 602. At step 604, a determination is made whether insufficient resources have been reserved for the backup task. In one embodiment, the step 604 may be performed during the resource monitoring step 504 of the method 500. If a sufficient resource reservation has been allocated, the method 600 ends at step 618. Otherwise, the method 600 proceeds to step 606.

At step 606, a determination is made whether there are sufficient resources (i.e., unreserved resources) available for the backup task. If there are no such resources, the method 600 proceeds to step 608. At step 608, the backup task is suspended. At step 610, a determination is made whether the backup task should be failed. For example, the backup task may be failed after being suspended for a predefined amount of time. Alternatively, the backup task may be failed if one or more other backup tasks have completed and there are still no available resources for the suspended backup task. If at step 610 the backup task should be failed, the method 600 proceeds to step 612, wherein the backup task is failed. The method 600 then ends at step 618. If at step 610 the back task should not be failed (i.e., remain suspended), the method 600 returns to step 606 and checks whether any resources have become available. If at step 606 sufficient resources for the backup task have become available, the method 600 proceeds to step 616. At step 616, the available resources are reserved and allocated to the executing backup task. The method 600 then ends at step 618.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

What is claimed is:

1. A method for managing backup tasks in a computer network, comprising:
    establishing an estimated resource utilization for a backup task of the backup tasks based on a set of backup statistics, wherein
        the estimated resource utilization comprises an identification of an amount of storage space;
    allocating a resource reservation for the backup task based on the estimated resource utilization thereof; and
    dynamically reducing the resource reservation of the backup task during execution of the backup task in response to detecting consumption of resources allocated in the resource reservation by the backup task, wherein
    the reducing the resource reservation of the backup task comprises:
        tracking resource usage for the backup task as the backup task is being performed;
        periodically releasing portions of the resource reservation over time throughout performance of the backup task wherein periodicity of the releasing is calculated based upon a rate of consumption of the resources;
        de-allocating the resource reservation of the backup task in response to completion thereof;
        suspending the backup task in response to resource usage thereof exceeding the resource reservation;
        requesting an additional resource reservation for the backup task;
        detecting additional resources becoming available;
        detecting that the additional resource reservation is granted;
        clearing a flag, where the flag indicates whether the backup task is suspended; and
        resuming the backup task.

2. The method of claim 1, wherein the estimated resource utilization further comprises a bandwidth required by the backup task.

3. The method of claim 1, wherein the establishing comprises:
    determining a series of resource usages for the backup task for a respective series of previous executions thereof;
    performing a trend analysis on the series of resource usages for the backup task to generate the estimated resource utilization thereof.

4. The method of claim 1, further comprising pre-allocating resources in a storage system to the backup task based on the resource reservation.

5. The method of claim 1, further comprising aborting the backup task tastes if the additional resource reservation is not granted.

6. An apparatus for managing backup tasks in a computer network, comprising:
    means for establishing an estimated resource utilization for a backup task of the backup tasks based on a set of backup statistics, wherein
        the estimated resource utilization identifies comprises an identification of an amount of storage space;
    means for allocating a resource reservation for the backup task based on the estimated resource utilization thereof; and
    means for dynamically reducing the resource reservation of the backup task during execution of the backup task in response to detecting consumption of resources allocated in the resource reservation generated by the backup task, wherein
    the reducing the resource reservation of the backup task comprises:
        means for tracking resource usage for the backup task as the backup task is being performed;
        means for periodically releasing portions of the resource reservation over time throughout performance of the backup task wherein periodicity of the releasing is calculated based upon a rate of consumption of the resources;
        means for de-allocating the resource reservation of the backup task in response to completion thereof;
        means for suspending the backup task in response to resource usage thereof exceeding the resource reservation;
        means for requesting an additional resource reservation for the backup task;
        means for detecting additional resources becoming available;
        means for detecting that the additional resource reservation is granted;
        means for clearing a flag, where the flag indicates whether the backup task is suspended; and
        means for resuming the backup task.

7. The apparatus of claim 6, wherein the estimated resource utilization for each of the backup tasks further comprises a bandwidth required by the backup task.

8. The apparatus of claim 6, wherein the means for establishing comprises:
    means for determining a series of resource usages for the backup task for a respective series of previous executions thereof;
    means for performing a trend analysis on the series of resource usages for the backup task to generate the estimated resource utilization thereof.

9. The apparatus of claim 6, further comprising means for pre-allocating resources in a storage system to the backup task based on the resource reservation of the backup task.

10. The apparatus of claim 6, further comprising a means for aborting the backup task if the additional resource reservation is not granted.

11. A non-transitory computer readable storage medium storing program instructions executable to:
   establish an estimated resource utilization for each of the backup tasks based on a set of backup statistics, wherein the estimated resource utilization identifies comprises an identification of an amount of storage space;
   allocate a resource reservation for each of the backup tasks based on the estimated resource utilization thereof; and
   dynamically reduce the resource reservation of a backup task of the backup tasks during execution of the backup task in response to detecting consumption of resources allocated in the resource reservation by the backup task, wherein
   the reducing the resource reservation of the backup task comprises:
      tracking resource usage for the backup task as the backup task is being performed;
      periodically releasing portions of the resource reservation over time throughout performance of the backup task wherein periodicity of the releasing is calculated based upon a rate of consumption of the resources;
      de-allocating the resource reservation of the backup task in response to the completion thereof;
      suspending the backup task in response to resource usage thereof exceeding the resource reservation;
      requesting an additional resource reservation for the backup task;
      detecting additional resources becoming available;
      detecting that the additional resource reservation is granted;
      clearing a flag, where the flag indicates whether the backup task is suspended; and
      resuming the backup task.

* * * * *